(12) United States Patent
Ye

(10) Patent No.: US 10,345,653 B2
(45) Date of Patent: Jul. 9, 2019

(54) FLEXIBLE TOUCH CONTROL DISPLAY SCREEN AND FABRICATING METHOD FOR THE SAME

(71) Applicant: WUHAN CHINA STAR OPTOELECTRONICS TECHNOLOGY CO., LTD., Wuhan, Hubei (CN)

(72) Inventor: Jian Ye, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 96 days.

(21) Appl. No.: 15/539,681

(22) PCT Filed: Mar. 29, 2017

(86) PCT No.: PCT/CN2017/078631
§ 371 (c)(1),
(2) Date: Jun. 25, 2017

(87) PCT Pub. No.: WO2018/152922
PCT Pub. Date: Aug. 30, 2018

(65) Prior Publication Data
US 2018/0284505 A1 Oct. 4, 2018

(30) Foreign Application Priority Data

Feb. 27, 2017 (CN) .......................... 2017 1 0115592

(51) Int. Cl.
*G02F 1/1343* (2006.01)
*G02F 1/1335* (2006.01)
(Continued)

(52) U.S. Cl.
CPC ...... *G02F 1/1343* (2013.01); *G02F 1/133514* (2013.01); *G06F 3/044* (2013.01);
(Continued)

(58) Field of Classification Search
None
See application file for complete search history.

(56) References Cited

U.S. PATENT DOCUMENTS

2018/0122863 A1* 5/2018 Bok ..................... H01L 27/3225
2018/0307368 A1* 10/2018 Koide .................. G06F 3/0416

FOREIGN PATENT DOCUMENTS

| CN | 102213852 A | 10/2011 |
| CN | 104216598 A | 12/2014 |

(Continued)

*Primary Examiner* — Ashok Patel
(74) *Attorney, Agent, or Firm* — Andrew C. Cheng

(57) ABSTRACT

A flexible touch control display screen includes an OLED display layer and a driving module. The OLED display layer is sequentially layer-stacked thereon with a cathode layer connected with the driving module and an encapsulation layer covering the cathode layer. The cathode layer constitutes an inductive electrode layer or a touch control driving electrode layer, which corresponds to the cathode layer. The encapsulation layer is disposed thereon with the touch control driving electrode layer or the inductive electrode layer. In a display stage of the flexible touch control display screen, the driving module applies display driving voltage on the cathode layer, and in a touch stage of the flexible touch control display screen, the driving module applies touch control voltage on the inductive electrode layer or the touch control driving electrode layer of the cathode layer. Also provided is a fabricating method for a flexible touch control display screen.

9 Claims, 3 Drawing Sheets

(51) Int. Cl.
*G06F 3/041* (2006.01)
*G06F 3/044* (2006.01)

(52) U.S. Cl.
CPC .. *G06F 3/0412* (2013.01); *G06F 2203/04102* (2013.01); *G06F 2203/04103* (2013.01); *G09G 2320/0233* (2013.01)

(56) References Cited

FOREIGN PATENT DOCUMENTS

| | | | |
|---|---|---|---|
| JP | 2005164924 | A | 6/2005 |
| JP | 2009251292 | A | 10/2009 |

* cited by examiner

FLEXIBLE TOUCH CONTROL DISPLAY SCREEN AND FABRICATING METHOD FOR THE SAME

CROSS-REFERENCE TO RELATED APPLICATIONS

This application claims the benefit of the priority of Chinese Patent Application No. 2017101155925, entitled "Flexible touch control display screen and fabricating method", filed on Feb. 27, 2017, disclosure of which is incorporated herein by reference.

FIELD OF THE INVENTION

The present invention relates to a field of a touch screen technology, and more particular to a flexible touch display screen and a fabricating method for the same.

BACKGROUND OF THE INVENTION

In conventional technology, a typical approach needs making touch control screen by alone for an Organic Light-Emitting Diode (OLED) display screen of a flexible touch control display screen, and then bonding an optical transparent adhesive on OLED to constitute a complete touch control display screen. This approach obviously increases an entire thickness of the touch control display screen.

SUMMARY OF THE INVENTION

The present invention provides a flexible touch control panel that decreases the entire thickness thereof, and a fabricating method.

The flexible touch control display screen introduced by the present invention, comprises an OLED display layer and a driving module, said OLED display layer is sequentially layer-stacked thereon with a cathode layer connected with the driving module and an encapsulation layer covering said cathode layer, said cathode layer constitutes an inductive electrode layer or a touch control driving electrode layer, the inductive electrode layer or the touch control driving electrode layer corresponds to said cathode layer, said encapsulation layer is disposed thereon with the touch control driving electrode layer or the inductive electrode layer. In a display stage of the flexible touch control display screen, said driving module applies display driving voltage on the cathode layer, and in a touch stage of the flexible touch control display screen, said driving module applies touch control voltage on the inductive electrode layer or the touch control driving electrode layer of said cathode layer.

Among them, the touch control driving electrode layer or inductive electrode layer on said encapsulation layer is a transparent conductive layer.

Among them, the touch control driving electrode layer or the inductive electrode layer on said encapsulation layer comprises a plurality of sub electrodes in regular arrangement, a surface of said encapsulation layer is disposed with a transparent insulating layer, a surface of said transparent insulating layer corresponding to said plurality of sub electrodes is disposed with grooves for accommodating said sub electrodes therein.

Among them, a surface of said encapsulation layer is disposed with a transparent conductive layer, the touch control driving electrode layer or the inductive electrode layer on said encapsulation layer comprises a plurality of sub electrodes in regular arrangement, a surface of the transparent insulating layer is formed with a silver nanowire network layer thereon, said plurality of sub electrodes are formed by the silver nanowire network layer formed on said transparent insulating layer surface.

Among them, the plurality of sub electrodes of the touch control driving electrode layer or the inductive electrode layer on said encapsulation layer are shaped in regular polygon or irregular polygon.

A fabricating method for a flexible touch control display screen, introduced by the present invention, comprises:

forming a cathode layer on a surface of an OLED display to constitute an inductive electrode layer or a touch control driving electrode layer;

forming an encapsulation layer on said cathode layer;

forming a transparent insulating layer on the encapsulation layer, forming the touch control driving electrode layer or the inductive electrode layer by said transparent insulating layer; and forming a cover plate on said encapsulation layer.

Among them, forming the cathode layer on the surface of the OLED display to constitute the inductive electrode layer or the touch control driving electrode layer comprises: forming the cathode layer on the surface of the OLED display, and patterning said cathode layer to form the inductive electrode layer or the touch control driving electrode layer.

Among them, patterning said cathode layer to form the inductive electrode layer or the touch control driving electrode layer applies a dry etching or a mask process.

Among them, said step of forming the transparent insulating layer on the encapsulation layer and forming the touch control driving electrode layer or the inductive electrode layer by said transparent insulating layer comprises, forming a silver nanowire network layer on the transparent insulating layer, and patterning the silver nanowire network layer to form the touch control driving electrode layer or the inductive electrode layer.

Among them, said step of forming the transparent insulating layer on the encapsulation layer and forming the touch control driving electrode layer or the inductive electrode layer by said transparent insulating layer comprises, forming the transparent insulating layer on the encapsulation layer, forming grooves by nanoimprint in arrangement according to patterns of said touch control driving electrode layer or inductive electrode layer, and filling said grooves with electrically conductive material to form the touch control driving electrode layer or the inductive electrode layer.

The flexible touch control display screen of the present invention integrates the inductive electrodes onto the cathode layer treated as a display driving, forms the touch control driving electrodes on the encapsulation layer to constitute a touch control structure, and decrease an entire thickness and a bonding process of the flexible touch control display screen.

BRIEF DESCRIPTION OF THE DRAWINGS

To clearly set forth the structural characteristics and the beneficial effects of the present invention, the following description is detailed with accompanying figures and embodiments.

DETAILED DESCRIPTION OF PREFERRED EMBODIMENTS

The followings will incorporate the inventive embodiments with its drawings, for more clearly and completely describing the technical solution of the inventive embodiments, wherein the drawings are regarded as just an exemplar expression, which just represents schematic diagrams but can not be realized as limited to the present invention.

Figure 1:
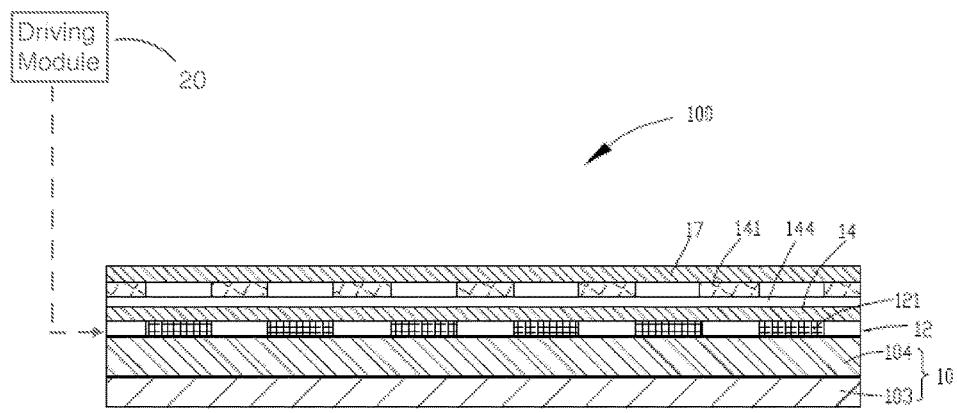
FIG. 1 depicts a cross-sectional schematic diagram of a flexible touch control display screen of the present invention.

Referring to FIG. 1, an embodiment of the present invention provides a flexible touch control display screen 100, which comprises an OLED display layer 10 and a driving module 20, a surface of said OLED display layer is sequentially layer-stacked thereon with a cathode layer 12 connected with the driving module, and an encapsulation layer 14 covering said cathode layer 12. Said cathode layer 12 constitutes an inductive electrode layer or a touch control driving electrode layer, the inductive electrode layer or the touch control driving electrode layer corresponds to said cathode layer 12, said encapsulation layer 14 is disposed thereon with the touch control driving electrode layer or inductive electrode layer. In this embodiment, an exemplar that said cathode layer 12 constitutes the inductive electrode layer 121 and said encapsulation layer 14 is disposed thereon with a touch control driving electrode layer 141 is described herein.

Said flexible touch control display screen 100 applies a dual-layer structure design for the inductive electrodes 121 and the touch control driving electrodes 141. Said inductive electrodes 121 and touch control driving electrodes 122 are coupled with each other to form a mutual capacitance structure.

In a display stage of the flexible touch control display screen 100, said driving module applies display driving voltage on the cathode layer 12 so as to accomplish a display function of the flexible touch control display screen 100 with said cathode layer 12; in a touch stage of the flexible touch control display screen 100, said driving module applies touch control voltage on the inductive electrode layer 121 so as to facilitate said inductive electrode layer 121 and the touch control driving electrode layer 141 on said encapsulation layer 14 being coupled with each other, thereby forming a mutual capacitance to accomplish a touch control function. It can be realized that, while displaying, said flexible touch control display screen 100 has timeliness and interval time that is too short to observe through eyes, so that during the user watches a change to touch control, the driving module timely alters the switch for the inductive electrodes and display function, according to the status of the flexible touch control display screen 100 and operating signal.

Said OLED display layer 10 comprises an array substrate 103 and an OLED layer 104 disposed on said array substrate. Said encapsulation layer 14 covers said cathode layer 12. The encapsulation layer 14 is applicable for protecting said OLED display layer 10 from corrosive damage caused with external moisture, oxygen and so forth. Said encapsulation layer 14 is sequentially layer-stacked thereon with a polarizer (not shown) and a transparent cover plate 17.

In this embodiment, the touch control driving electrode layer 141 on said encapsulation layer 14 is a transparent conductive layer. The touch control driving electrode layer 141 comprises a plurality of sub electrodes in regular arrangement. In this embodiment, a plurality of sub electrodes are arranged in grid arrangement. A plurality of sub electrodes of the touch control driving electrode layer 141 are shaped in regular polygon or irregular polygon. For example, a regular hexagon, rectangle or triangle; and also, an irregular shape, such as a tilted pentagon.

In this embodiment, a surface of said encapsulation layer 14 is disposed with a transparent insulating layer 144, a surface of said transparent insulating layer 144 is formed with a silver nanowire network layer 145 thereon, said plurality of sub electrodes of the touch control driving electrode layer 141 on said encapsulation layer 14 is formed by etching or patterning the silver nanowire network layer. Please refer to a fabricating method of the present invention for substantial statement.

Figure 2:
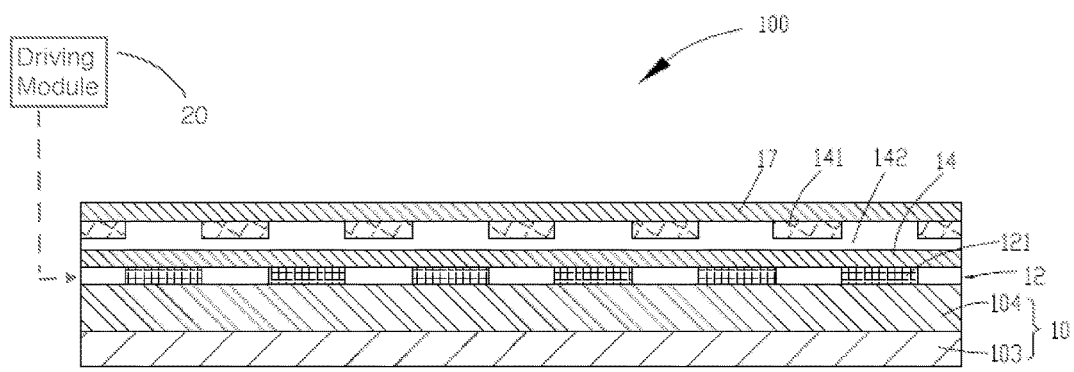
FIG. 2 depicts a cross-sectional schematic diagram of a flexible touch control display screen of another embodiment of the present invention.

Referring to FIG. 2, a difference of another embodiment from the aforementioned embodiment is that, a surface of said encapsulation layer 14 is disposed with a transparent insulating layer 142, as an insulating layer, the surface of said transparent insulating layer 142 corresponding to said plurality of sub electrodes is disposed with grooves for accommodating said sub electrodes therein 143. Said sub electrodes are formed by filling said grooves 143 with electrically conductive material.

In the present invention, said flexible touch control display screen 100 integrates the inductive electrodes 121 onto the cathode layer 12 treated as display driving, and forms the touch control driving electrode 141 on the encapsulation layer 14 so as to make the touch control driving electrode 141 and the inductive electrode 121 constituting a touch control structure. Compared with the conventional technology that extraly makes a touch control screen to be bonded on the OLED display layer 10, this decreases an entire thickness and a bonding process of flexible touch control display screen 100, thereby satisfying the demand on a slim screen body of flexible touch control display as well as simplifying process and effectively lowering fabricating cost.

Figure 3:
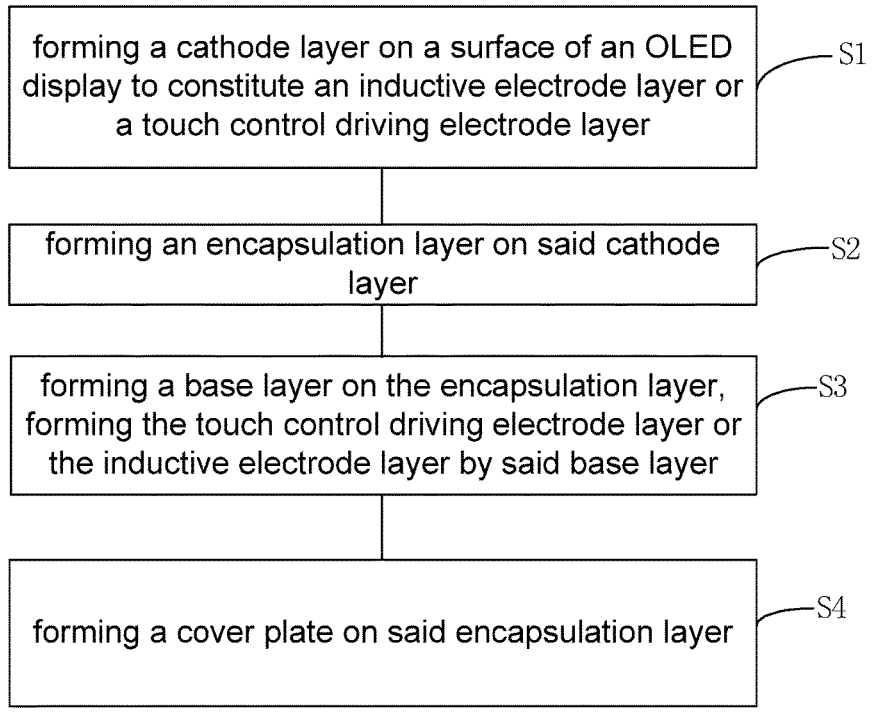
FIG. 3 depicts a flow chart of a fabricating method for a flexible touch control display screen of the present invention.

Referring to FIG. 3, a fabricating method for said flexible touch control display screen, which the present invention provides in an exemplar of using said cathode layer 12 constituting the inductive electrode layer, comprises:

step S1, forming a cathode layer on a surface of the OLED display layer 10 to constitute an inductive electrode layer;

step S2, forming the encapsulation layer 14 on said cathode layer 12;

step S3, forming a transparent insulating layer on the encapsulation layer 14, forming the touch control driving electrode layer 141 by said transparent insulating layer; and step S4, forming a cover plate on said encapsulation layer 14.

In this embodiment, wherein, an implementing approach in the step S1 is that, forming the cathode layer on the surface of the OLED display layer to constitute the inductive electrode layer or the touch control driving electrode layer comprises: forming the cathode layer on the surface of the OLED display layer, and patterning said cathode layer to form the inductive electrode layer or the touch control driving electrode layer, wherein, said step of patterning said cathode layer to form the inductive electrode layer or the touch control driving electrode layer applies a dry etching or a mask process.

Another implementing approach in the step S1 is that, the inductive electrode layer or the touch control driving electrode layer constituted with said cathode layer 12 is formed by way of vacuum deposition method.

Figure 4:
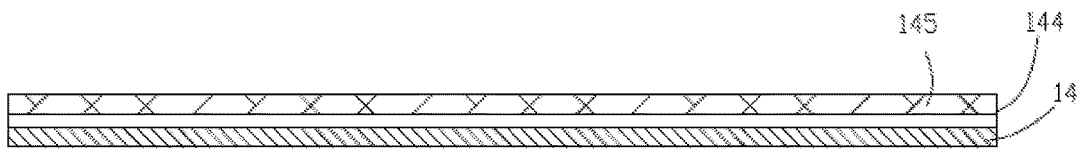
FIG. 4 and FIG. 5 are schematic diagrams of a manufacturing approach in step 3 of the fabricating method for the flexible touch control display screen shown in FIG. 3.
Figure 5:
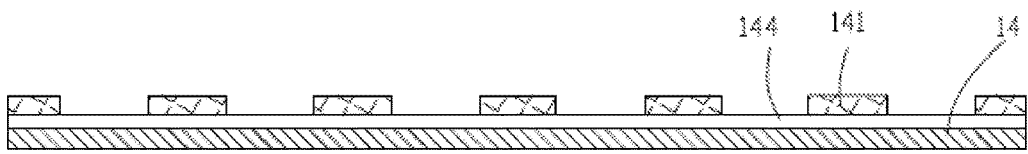

Referring to FIG. 4 and FIG. 5, an approach in the step S3, said step of forming the transparent insulating layer 144 on the encapsulation layer 14 and forming the touch control driving electrode layer 141 by said transparent insulating layer comprises, forming the transparent insulating layer 144 on the encapsulation layer 14, forming the silver nanowire network layer 145 on the transparent insulating layer 144, and patterning the silver nanowire network layer 145 to form a plurality of sub electrode patterns of the touch control driving electrode layer 141, wherein patterning denotes mask, exposure and development or etching etc. pattern process.

Figure 6:
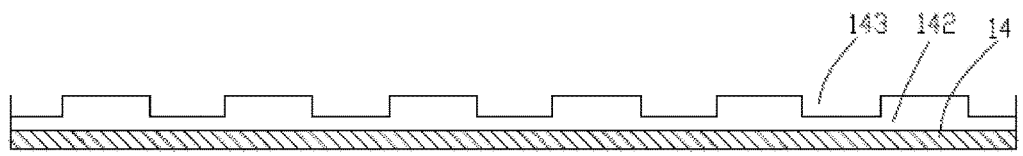
FIG. 6 and FIG. 7 are schematic diagrams of another manufacturing approach in step 3 of the fabricating method for the flexible touch control display screen shown in FIG. 3.
Figure 7:
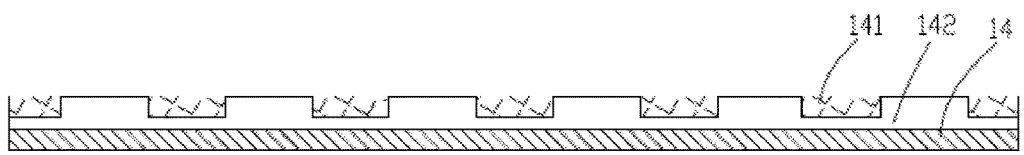

Referring to FIG. 6 and FIG. 7, another approach in the step S3, said step of forming the transparent insulating layer 142 on the encapsulation layer 14 and forming the touch control driving electrode layer 141 by said transparent insulating layer 142 comprises, forming the transparent insulating layer 142 on the encapsulation layer 14, forming grid-shaped grooves 143 on the transparent insulating layer 142 by nanoimprint approach, and then filling inside said grooves 143 with electrically conductive material to form said touch control driving electrode layer 141.

In the fabricating method for the flexible touch control display screen of the present invention, it is not required to extraly fabricate a touch control screen and then to bond the touch control screen on the OLED display layer, but directly integrates electrodes having touch control function onto the OLED display layer, thereby decreasing difficulty of machining process, and saving cost.

The aforementioned is as the preferred embodiments of the present invention, it should be to know that, to any persons who are ordinary skilled in the art, other related change or variances not departing from principle of the present invention can be made which should be covered by the protected scope of the subject claims of the present invention.

What is claimed is:

1. A fabricating method for a flexible touch control display screen, wherein said method comprises:
   forming a cathode layer on a surface of an OLED display to constitute an inductive electrode layer or a touch control driving electrode layer;
   forming an encapsulation layer on said cathode layer;
   forming a transparent insulating layer on the encapsulation layer, wherein a touch control driving electrode layer or an inductive electrode layer is formed on the encapsulation layer by means of said transparent insulating layer; and
   forming a cover plate on said encapsulation layer.

2. The fabricating method for the flexible touch control display screen as claimed in claim 1, wherein forming the cathode layer on the surface of the OLED display to constitute the inductive electrode layer or the touch control driving electrode layer comprises: forming the cathode layer on the surface of the OLED display, and patterning said cathode layer to form the inductive electrode layer.

3. The fabricating method for the flexible touch control display screen as claimed in claim 2, wherein patterning said cathode layer to form the inductive electrode layer applies a dry etching or a mask process.

4. The fabricating method for the flexible touch control display screen as claimed in claim 1, wherein said step of forming the transparent insulating layer on the encapsulation layer and forming the touch control driving electrode layer or the inductive electrode layer by said transparent insulating layer comprises, forming a silver nanowire network layer on the transparent insulating layer, and patterning the silver nanowire network layer to form patterns of the touch control driving electrode layer.

5. The fabricating method for the flexible touch control display screen as claimed in claim 1, wherein said step of forming the transparent insulating layer on the encapsulation layer and forming the touch control driving electrode layer or the inductive electrode layer by said transparent insulating layer comprises, forming the transparent insulating layer on the encapsulation layer, forming grooves by nanoimprint in arrangement according to patterns of said touch control driving electrode layer, and filling said grooves with electrically conductive material.

6. The fabricating method for the flexible touch control display screen as claimed in claim 1, wherein said step of forming the transparent insulating layer on the encapsulation layer and forming the touch control driving electrode layer or the inductive electrode layer by said transparent insulating layer comprises, forming a silver nanowire network layer on the transparent insulating layer, and patterning the silver nanowire network layer to form patterns of the inductive electrode layer.

7. The fabricating method for the flexible touch control display screen as claimed in claim 1, wherein said step of forming the transparent insulating layer on the encapsulation layer and forming the touch control driving electrode layer or the inductive electrode layer by said transparent insulating layer comprises, forming the transparent insulating layer on the encapsulation layer, forming grooves by nanoimprint in arrangement according to patterns of said inductive electrode layer, and filling said grooves with electrically conductive material.

8. The fabricating method for the flexible touch control display screen as claimed in claim 1, wherein forming the cathode layer on the surface of the OLED display to constitute the inductive electrode layer or the touch control driving electrode layer comprises: forming the cathode layer on the surface of the OLED display, and patterning said cathode layer to form the touch control driving electrode layer.

9. The fabricating method for the flexible touch control display screen as claimed in claim 8, wherein patterning said cathode layer to form the touch control driving electrode layer applies a dry etching or a mask process.

* * * * *